United States Patent [19]

Seinera et al.

[11] Patent Number: 4,803,231

[45] Date of Patent: Feb. 7, 1989

[54] THERMOPLASTIC COMPOSITIONS WITH VERY HIGH CONTENT OF PULVERULENT MINERAL MATERIALS FOR INCORPORATION INTO POLYMERS

[75] Inventors: Henri Seinera, Oullins; Patricia Luberne, Gennevilliers; Claude Stock, Champs-Sur-Marne; Patrick Trouve, Clamart, all of France

[73] Assignee: Pluess Staufer A. G., Oftringen, Switzerland

[21] Appl. No.: 792,523

[22] Filed: Oct. 29, 1985

[30] Foreign Application Priority Data

May 21, 1985 [FR] France ................... 85 07819

[51] Int. Cl.$^4$ .................. C08K 5/52; C08K 3/34; C08K 3/26
[52] U.S. Cl. .................. 523/219; 524/140; 524/141; 524/142; 524/143; 524/144; 524/145; 524/423; 524/424; 524/425; 524/427; 524/437; 524/447; 524/449; 524/451; 524/456; 524/504; 524/570; 524/577; 524/579; 524/583; 524/585
[58] Field of Search ................ 524/140–145; 523/219

[56] References Cited

U.S. PATENT DOCUMENTS 3,773,708 11/1973 Takahashi et al. ............... 524/425
4,191,798 4/1980 Schumacher et al. .
4,210,572 7/1980 Herman et al. ................... 524/590
4,455,344 6/1984 Matsuyama ....................... 428/327

FOREIGN PATENT DOCUMENTS 0114724 1/1984 European Pat. Off. .
0100066 8/1984 European Pat. Off. .
0163796 9/1983 Japan ................................ 524/145

*Primary Examiner*—Herbert J. Lilling
*Attorney, Agent, or Firm*—Oblon, Fisher, Spivak, McClelland & Maier

[57] ABSTRACT

Coherent thermoplastic aggregates with very high content of pulverulent mineral materials, said aggregates comprised of the said mineral materials, further of polyolefin polymers and/or copolymers, and possibly additionally of miscellaneous known additives; characterized in that, with the aim of achieving a density near to or at most equal to the theoretical density of the pulverulent mineral materials entering into their composition, while still having excellent compatibility with the polymers of redispersion, i.e., the polymers into which the subject aggregates are to be mixed, the interparticle voids between the grains of the mineral materials, which grains are basically in contact with each other, are at most filled—in the presence of a fluidifacient agent—by at least one polyolefin polymer and/or copolymer having a fusion temperature and/or softening temperature at least equal to 60° C., and having a fluidity index (ASTM 1238) of at least 50.

13 Claims, 2 Drawing Sheets

THERMOPLASTIC COMPOSITIONS WITH VERY HIGH CONTENT OF PULVERULENT MINERAL MATERIALS FOR INCORPORATION INTO POLYMERS

The invention relates to thermoplastic compositions or thermoplastic aggregates basically comprising a high content of pulverulent mineral materials as well as a small quantity of at least one polyolefin thermoplastic polymer and/or copolymer, said polymer and/or copolymer having a high index of fluidity. The subject compositions further contain an agent ("fluidifacient") which renders fluid the mixture comprised of the pulverulent mineral materials and the thermoplastic polymer(s) and/or copolymer(s). The purpose of the subject compositions or aggregates is to be eventually incorporated into thermoplastic polymers.

DISCUSSION OF THE BACKGROUND

In general, it has been long known to prepare thermoplastic granules formed from a mineral and/or organic pulverulent material, such as calcium carbonate, which material is finely ground, said granules may also contain in addition various agents such as stabilizers, lubrifacients, plasticizers, crosslinking agents, biocides, fire retardants, and a polyolefin. The mixture of these various constituents is submitted to thermal and mechanical treatments comprising malaxation and extrusion.

In the past, those skilled in the art have tried to vary the composition of the granules to maximize the amount of mineral and/or organic material, using the approach of employing more and more powerful malaxation devices. It is recognized today that it is difficult to achieve a proportion of mineral matter greater than 75 wt. % of the granules, i.e., 300 parts by weight per 100 parts by weight of polymer, without encountering major difficulties in the preparation and/or use of the granule products, for example, difficulties in the redispersion of the mineral material in the polymers.

One of the major drawbacks which occurs when employing mineral materials in high amounts near the above-mentioned limits is the heterogeneity during the malaxation of the mixture formed from the mineral filler and the polymer, for example, a polyolefin. This heterogeneity may lead to the granules having very heterogeneous compositions, which may be detrimental to their subsequent usefulness. In particular, lack of homogeneity frequently is the cause of the deterioration of mechanical characteristics of plastic materials to which such granules have been added.

Another equally important disadvantage occurs when one skilled in the art attempts to increase to an excessive degree the amount of mineral matter with respect to the amount of thermoplastic polymer employed in the mixture, i.e., when an attempt is made to introduce more than 300 parts by weight of mineral filler per 100 parts by weight of polymer. In this case, at the time of malaxation of the components, and depending on the type of malaxation device employed, either the mixture sets, which causes blocking of the malaxation device (e.g., when said device is a screw-type device), or the constituents separate, making it impossible to combine them using a malaxation device of the type with propellers or rotors.

Further, under these conditions it becomes impossible to use the granules, i.e., to redisperse the heterogeneous compositions into the final thermoplastic polymers, without risking the irregular addition of additives to the plastic materials, whereby the surface appearance and certain material characteristics will be substantially deleteriously affected, and may even be rendered completely unsatisfactory.

Thus, it has been shown that the ratio of the amount of mineral material in the granules to the amount of thermoplastic polymer is naturally limited by the aforesaid major drawbacks.

These difficulties have in the past spurred research into improvements which can be applied to various constituents of the plastic compositions to enable the compositions to contain greater amounts of mineral material without resulting in the said drawbacks.

A number of solutions have been proposed in the literature to alleviate the aforesaid major disadvantages.

First of all, because the mineral materials are frequently hydrophilic in character, they seem to be relatively incompatible with all polymers, and in particular with substantially hydrophobic polymers. It is known that the presence of hydrophilic mineral materials in substantial amounts on the order of those known in the prior art can cause deterioration of the mechanical characteristics of the polymers to which the hydrophilic materials have been added. In order to combat this phenomenon, the literature recommends mitigating the hydrophilic character of the mineral materials (e.g., natural, finely ground calcium carbonates) by treating them with organic substances which form an envelope which is compatible with the polymers. Thus, natural calcium carbonates have been treated with agents chosen from among the unsaturated (or otherwise) carboxylic acids of moderate to high molecular weight, such as butyric, lauric, oleic and stearic acids, and from among the high molecular weight alcohols modified by combination to form, for example, sulfonates or sulfates (Fr. Pat. No. 1,047,087). However, it has been shown that the use of calcium carbonate modified by such a treatment does not enable the quantity of mineral materials in the polymers to be appreciably increased.

Subsequently it was proposed to provide compatibility between the hydrophilic mineral material and the hydrophobic polymer by introducing, during the preparation of the composition, a bonding agent between the mineral filler and the polymer, said agent comprising an organophosphorus compound, namely a phosphonate or a phosphonic acid, such that the plastic molding compound, i.e., the final product, contains from 90-20 parts by weight of a polyolefin, from 10-80 parts by weight of an alkaline earth carbonate, and from 0.1-10 parts by weight of the bonding agent, with the parts by weight being on the basis of the amount of mineral filler (Ger. Pat. No. 2,735,160). However, it was shown that the use of such an agent does not provide the expected improvements. Stated otherwise, the compatibility between the hydrophilic mineral filler and the hydrophobic polyolefins is not appreciably improved, and certain mechanical properties of interest of the filled polymers remain unsatisfactory.

It has also been proposed that the compatibility between the hydrophilic mineral material and the hydrophobic polymer can be improved by substituting, for the above-mentioned bonding agent, an organosulfur compound, namely a sulfate ester, a sulfonic acid, or a derivative of one of these (Eur. Pat. No. 0 017 038). It has been shown that the use of such an organosulfur agent does improve certain mechanical properties of the filled polymers, due to the bonding effect, for certain recommended amounts of mineral material; however, the amount of mineral material remains limited to at most 80 wt. % of the total weight of the composition, i.e., 400 parts by weight of mineral material per 100 parts by weight of the overall sum of the polymer and the bonding agent.

Finally, in U.S. Pat. No. 4,455,344 it has been proposed to prepare granules with the following composition:
- (a) 60-90 parts by weight of a mineral filler having a mean dimension of 0.5-100 microns;
- (b) 5-35 parts by weight of a crystalline polyolefin having mean dimension of 150-1000 microns; and
- (c) 5-35 parts by weight of a binder having a fusion temperature at least 10° C. less than that of the crystalline polyolefin.

To yield such granules, the proposed method consists of covering the crystalline polyolefin and/or the particles of mineral filler with the binding agent, to form an envelope which ensures that the particles will mutually adhere. However, it has been experimentally verified that granules prepared according to this process cannot support a concentration of mineral material greater than 80 wt. % without showing poor redispersion into the polymers, even if one employs a mineral material of relatively high mean particle size, e.g., 50 microns. The limit of 80 wt. % becomes absolutely inattainable due to the occurrence of phase separation during the malaxation. This separation occurs when the particle size of the mineral filler is chosen with mean value less than 50 microns, e.g., if a particle mixture is used having mean particle size on the order of 3 microns.

Such a method does not result in a coherent pasty mixture, i.e., a mixture having uniform mixture composition at the temperature at which it is produced and with the means employed. Rather, it yields incoherent agglomerates, i.e., agglomerates which have compositions which generally differ one from the other and are of irregular dimensions, and which later lead to poor redispersion, as the present Applicant has been able to demonstrate.

SUMMARY OF THE INVENTION

In the face of the above-mentioned drawbacks, the present Applicant has conducted research, and has developed, by a novel combination of means which may or may not have been known, plastic compositions or aggregates with a very high content of pulverulent mineral materials, with said pulverulent materials having a particle size distribution such that 95% of the particles have at least one dimension <30 microns.

DESCRIPTION OF THE PREFERRED EMBODIMENTS

The present invention concerns coherent thermoplastic aggregates having a very high content of pulverulent materials and being comprised of the pulverulent materials as well as of polyolefin polymers and/or copolymers, and possibly, in addition, of miscellaneous known additives. The aim of the invention is to achieve a density near to or at most equal to the theoretical density of the pulverulent mineral materials entering into their composition, while still having excellent compatibility with the polymers of redispersion, i.e., the polymers into which the subject aggregates are to be mixed. The interparticle voids between the grains of the mineral materials, which grains are basically in contact with each other, are at most filled—in the presence of a fluidifacient agent—by at least one polyolefin polymer and/or copolymer having a fusion temperature and/or softening temperature at least equal to 60° C., and having a fluidity index (ASTM 1238) of at least 50.

According to the standard of ASTM 1238, the fluidity index characterizing the polymer and/or copolymer according to the invention is the amount of polymer and/or copolymer (in grams per 10 min) which, at a selected temperature in the interval limited by the softening and transformation temperatures, flows from a given standard charge (2.16 kg, 5 kg, 10 kg, or 21.6 kg) through a die orifice of established diameter (2.09-2.10 mm) within a measured period of time.

If the granules according to the prior art are fabricated from mixtures comprised of pulverulent mineral materials, at least one polyolefin polymer and/or copolymer, and possibly additional miscellaneous known additives, it is noted that according to the prior art the polymers and/or copolymers used are always chosen from among those having an index of fluidity <50 under the conditions of ASTM 1238. The use of such polymers does not enable granules to be produced which comprise pulverulent mineral materials in the amount of >80 wt. %; this limitation has been verified. If an attempt is made to incorporate more than 80 wt. % of such mineral materials in granules according to the prior art, it becomes impossible to redisperse the granules when added to other plastics, in the sense that their components cannot be homogeneously redistributed into the customary polymers in which redistribution is desired (e.g., polyolefins).

In the context of the preceding, the aggregates according to the invention comprise in their compositions a very high content of pulverulent mineral material, as well as at least one polyolefin polymer and/or copolymer and possibly additional miscellaneous known additives; and the subject aggregates are also characterized by the fact that the polyolefin polymer and/or copolymer is chosen from among those having a fusion or softening temperature of at least 60° C. and an index of fluidity according to ASTM 1238 of at least 50, and further said polymer and/or copolymer is employed in said compositions in a minor quantity and in the presence of a fluidifacient agent.

The composition of the inventive thermoplastic aggregates is as follows (in units of wt. % of the total weight of the aggregate):
- (a) 19.99-4.05 units of at least one polyolefin polymer and/or copolymer having a fusion and/or softening temperature of at least 60° C. and an index of fluidity of at least 50;
- (b) 80-95 units, preferably 85.7-92.3 units, of pulverulent mineral materials, thus present in the amount of 400-1900 (and preferably 600-1200) parts by weight per 100 parts by weight of the said polyolefin polymer and/or copolymer;
- (c) 0.01-0.95 units of an agent which renders the mixture fluid (a fluidifacient).

The polyolefin polymers and/or copolymers entering into the composition of the inventive aggregates are chosen from among those having a fusion and/or softening temperature of at least 60° C. and an index of fluidity (ASTM 1238) of at least 50; these include low density polyethylenes (which may be linear or branched), high density polyethylenes, polypropylene homopolymers or copolymers, polyisobutylenes, copolymers obtained by copolymerization of at least two monomers from among ethylene, propylene, and isobutylene; polyolefins modified by grafting or copolymerization (e.g., halogenated polyolefins), polyethylene(vinyl acetate) copolymers, ethylene-(acrylic acid) copolymers, ethylene-(ethyl acrylate) copolymers, ethylene-(methyl acrylate) copolymers, ethylene-(butyl acrylate) copolymers; "EPDM" modified polypropylenes, "SEBS" modified polypropylenes; or a physical mixture of at least two of the preceding polymers and/or copolymers.

Preferably, the polyolefin polymers and/or copolymers entering into the composition of the inventive aggregates are chosen from among those having an index of fluidity of at least 200.

The pulverulent mineral materials entering into the composition of the inventive aggregates may be natural or synthetic in origin and may be introduced individually or in mixtures. In generaly they are chosen from among the mineral salts and/or oxides containing at least one metallic element. Examples are the alkaline earth carbonates such as calcium carbonate; magnesium carbonate; zinc carbonate; dolomite; lime; magnesia; barium sulfate, calcium sulfate; aluminum hydroxides, silica, argils, and other silico-aluminous materials such as kaolin, talc, and mica; metal oxides (zinc oxide), iron oxides, titanium oxides; glass fibers and glass microspheres; and wollastonite. There may be added, to these pulverulent mineral materials, organic pulverulent materials of natural or synthetic origin (e.g., colorants, starch, cellulose fibers and granules, and carbon fibers).

All the pulverulent mineral materials may be employed individually or in combination, depending on the type of aggregate desired.

Preferably, the pulverulent materials employed in the invention have at least one dimension between 0.01 and 100 microns, particularly between 0.5 and 5 microns. The amount of pulverulent mineral materials introduced into the mixture not only depends on the nature of the materials but also on their particle size distributions.

The fluidifacient agent used in connection with the invention has the general formula where A represents ethylene oxide; B represents propylene oxide; $0 < (m+n) < 24$; R represents an alkyl group (which may be linear or nonlinear, and may be saturated or unsaturated), an aryl group, or a heterocycle (which may be saturated or unsaturated), wherewith said alkyl, aryl, or heterocycle group has 5–28 C atoms, preferably 8–24 C atoms, or R is a steroid group; wherewith further the group R may be branched or unbranched and/or may hae one or more functional groups, for example, halogen, —OH, —COOH, —COOR, —NO$_2$, —NH$_2$, —CONH$_2$, —CN, or OPO$_3$H$_2$; and R′ may be hydrogen, a carbon chain having 1–4 C atoms, or a group R as defined supra. Thus it is possible that the group R′ is identical to the group R.

Examples of groups which may be used for the group R are quite diverse groups such as n-hexyl, n-octyl, n-decyl, n-dodecyl, n-dodecyldi(oxyethylene), n-tetradecyl, n-hexadecyl, n-hexadecyltri(oxyethylene), n-octadecyl, n-octadecyl-oxyethylene, n-octylpenta(oxyethylene), n-heptadecyl, phenyl, 2-methyl, 2-butyl, 2-methylbutyl, 3-phenyl, 1-propenyl, 1-phenyl, propenyl, p-nonylphenyldi(oxyethylene), p-methylphenyl, cyclohexyl, cholesterolyl, beta-naphthyl, and groups which are diols.

The additional miscellaneous known additives which may be introduced into the composition of the inventive aggregates are taken from the groups comprised of thermal or photochemical stabilizing agents, lubrifacients, plasticizers, antistatic agents, fire retardants, and metal-passivating agents (e.g., copper passivating agents).

The inventive aggregates are prepared using methods and means which are known to those skilled in the art and which comprise stages of malaxation and granulation.

The malaxation stage is carried out in a mixer furnished with means of agitation and means of heating, such that the masses being processed are treated at the transformation temperature of the polyolefins (which polyolefins have index of fluidity at least 50) and under sufficient agitation to achieve mixing of the components, which are introduced successively or simultaneously into the malaxation device. The transformation temperature of the polyolefins is generally in the range 60° C.–300° C.

The malaxation may be carried out using a malaxation device of known type, e.g., internal continuous or discontinuous mixers, double-screw extruders, or rapid mixers.

The granulation stage following the malaxation stage enables the hot mixture proceeding from the malaxation device to be transformed, by known means (e.g., by extrusion through an extrusion die, followed by cutting; or by calendering to form a sheet, followed by cutting; or by the use of granule-forming rolls).

The aggregates obtained according to the invention have a size which is advantageously close to that of the granules of the polymers in which redispersion is desired.

The aggregates according to the invention provide excellent compatibility of redispersion into polymers and/or copolymers chosen from the group comprising polyolefin homopolymers or copolymers (e.g., low density or high density polyethylenes, linear polyethylenes, polypropylenes, ethylene-propylene copolymers, ethylene(vinyl acetate) copolymers, and ethylene-(acrylic acid) copolymers, halogenated polyethylenes (such as chlorinated polyethylene), polybutene, polymethylbutene, polyisobutylene, polystyrenes and polystyrene derivatives (e.g., SB, ABS, SA, and SBS rubbers), PVCs, polycarbonates, saturated polyesters (e.g., polyethylene terephthalates and/or polybutylene terephthalates), and polyphenylene oxides.

The redispersion of the aggregates according to the invention is carried out in a polymer and/or copolymer chosen from among the aforementioned group of polymers and/or copolymers, with the use of premixtures, and employing processing methods well known in the art.

Among the processing methods which may be chosen, one may cite in particular, as illustrative examples, extrusion of a film or tubular film, extrusion of narrow strips, and extrusion of a coating on paper or metal sheet or foil. The premixtures may comprise the aggregates of the present invention in the amount of 1–30 wt. % of the total formulation. Other possible processing methods include injection molding, blow molding of hollow pieces; extrusion of tube, shape, or sheet; fabrication of sire and cable; and calendering; wherewith the premixtures may comprise the aggregates in the amount of 1-70 wt. % of the total formulation.

BRIEF DESCRIPTION OF THE DRAWINGS

The invention will be better understood with the aid of the illustrative description of the Figures, and with the aid of the Examples describing preparation and redispersion of aggregates according to the invention.

The photographs (Figures) illustrate the state of the surfaces on various microtome cuts made in prior-art-type granules and in granules according to the invention.

Figure 1:
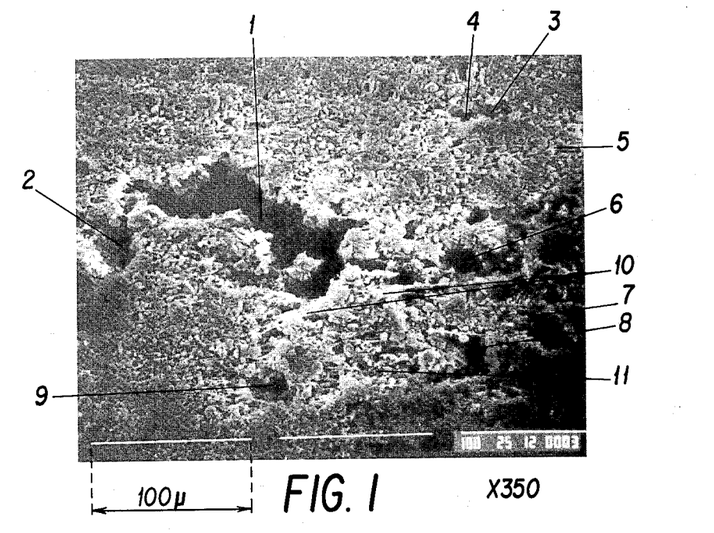
FIG. 1 is an electron micrograph (350×, scanning electron microscope) of a microtome section of a prior art granule.

The microtome section according to FIG. 1 is of a granule prepared according to a known type of prior art method and having the following composition: 80 wt. % $CaCO_3$ having mean diameter 3 microns and maximum dimension 10 microns (the product "Millicarb" of the company Omya) and 20 wt. % low density polyethylene having index of fluidity 20. The granule has been prepared at 190° C. in a "Buss" co-malaxaton device, starting with a premixture of the mineral materials and the polymer, said premixture produced at ambient temperature. At concentrations of mineral materials ($CaCO_3$) greater than 80 wt. %, it has been impossible to produce correct binding of the said mineral materials by the polymer, in that a major fraction of the initial mixture of the components is in the form of distinct phases.

A number of cavities (1, 2, 6, 7, 8, and 9) may be seen in FIG. 1, distributed over the cross section. One of these cavities (reference numeral 1) is extremely important because its major dimension is on the order of 150 microns. One may also detect the imprints of grains of mineral material which have been pulled away (3, 4, and 5) in the course of the cutting with the microtome; as well as numerous sheets and/or filaments of polyolefin polymer (10 and 11). The existence of sheets and/or filaments of polymer enables affirmation that the mineral particles are in fact immersed in the medium comprising the polymer with index of fluidity <50.

The mixture formed by the polymer and the mineral material has a non-measurable (at 190° C., with charge 2.16 kg) index of fluidity when subjected to malaxation. This corresponds to a medium with very high viscosity, which underlies the appearance of cavities of substantial dimension with retention of a gas phase.

Figure 2:
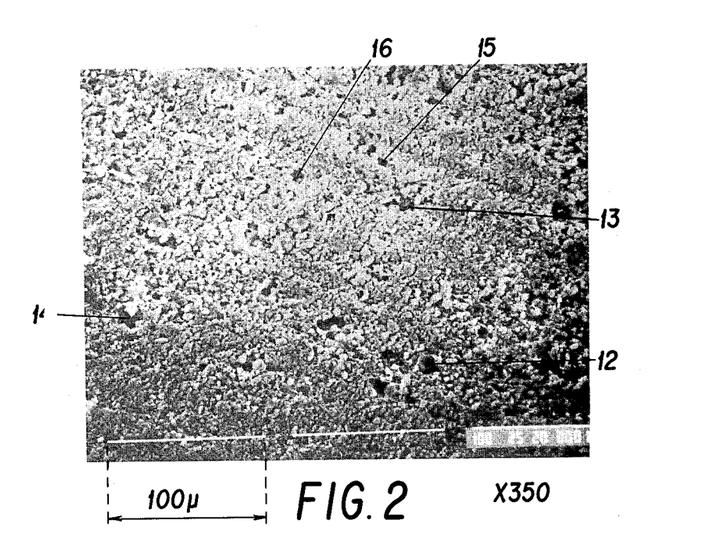
FIG. 2 is an electron micrograph (350×, scanning electron microscope) of a microtome section of an aggregate according to the invention.

The microtome section of FIG. 2 concerns an aggregate according to the invention having the following composition in wt. % of the total: 88 wt. % $CaCO_3$ ("Millicarb"), 11.2 wt. % polymer with index of fluidity 800 measured at 140° C. and 2.16 kg ("Vestoplast 3632", marketed by the company Huels), and 0.8 wt. % of a fluidifacient agent which is an alkyl phosphate, namely $C_{14}-H_{29}-OPO_3H_2$. The mixture has been prepared in a "Buss" co-malaxation device, at 140° C., from a premixture produced at ambient temperature from the three aforesaid components.

In FIG. 2 the imprints can be seen of grains of mineral material which have been pulled away during the microtome cutting (12–16), but it is seen that it is practically impossible to discern traces of masses of polymers as in FIG. 1, nor can any cavities be detected. Thus the indication is that the aggregates according to the invention are very coherent.

Figure 3:
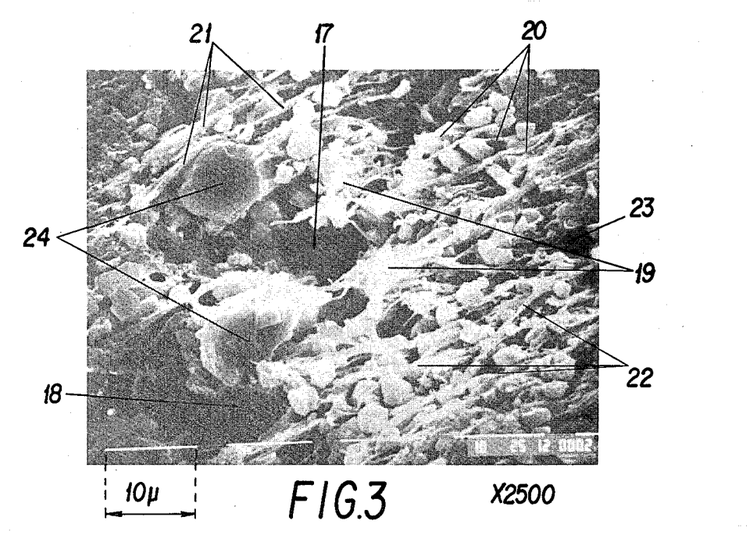
FIG. 3 is an electron micrograph (2500× scanning electron microscope) of the same microtome section of a prior art granule as shown in FIG. 1, but at higher magnification.

FIG. 3 shows an enlargement of part of FIG. 1 concerning a prior-art-type granule. Cavities (17, 18) can be seen which result from a gas phase enclosed by the mixture, the mixture having an index of fluidity which was immeasurably low at 190° C. with a charge of 2.16 kg. There can also be seen sheets (19) of polymers and a large number of polymer filaments (20–22). These filaments are entagled and have a strong and irregular texture. Finally, a few large grains of mineral materials (24) may be distinguished having maximum dimension on the order of 10 microns; and one can also see imprints of grains which have been pulled away (23) during the microtome cutting.

Figure 4:
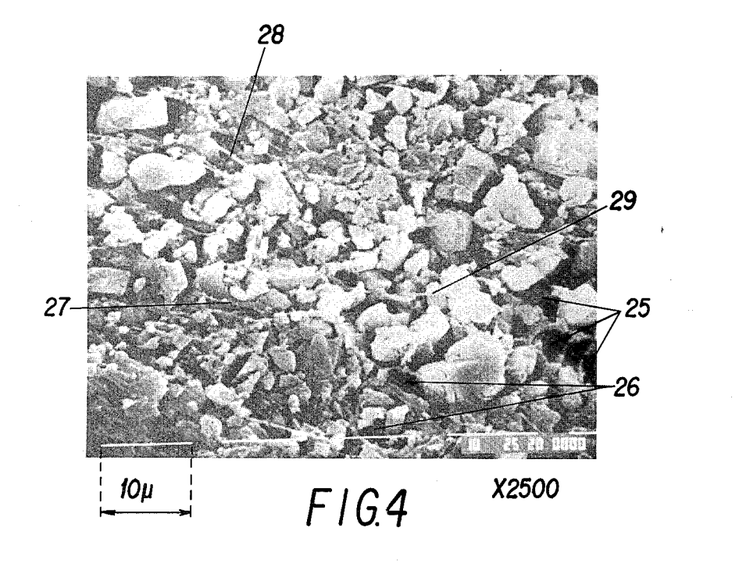
FIG. 4 is an electron micrograph (2500× scanning electron microscope) of the same microtome section of an aggregate according to the invention as shown in FIG. 2, but at higher magnification.

FIG. 4 is an enlargement of part of FIG. 2, and concerns an aggregate according to the invention. One may see a few cavities (e.g., 25 and 26) which are caused by pulling away of grains of mineral matter during the microtome cutting. There are also seen occasional polymer filaments (27–29) which enable appreciation of the very high concentration of mineral material and the existence of a semi-organized structure of particles of mineral material. These particles are practically in contact with each other and thereby define interparticular voids which are at most filled with the said polymer.

The various microscope observations related to the coherence of the aggregates according to the invention and to the presence of cavities in the granules according to the prior art are confirmed by measures of the real densities compared to the theoretical densities. Thus, in the case of the prior art (FIGS. 1 and 3) the experimentally determined density of the granules was 1.83 g/cc, whereas the theoretical density of the granules (determined by calculation based on the various constituents) was 1.95 g/cc—a discrepency on the order of 6%, which indicates the presence of the said cavities.

In the case of the aggregates according to the invention, the coherence of the semi-organized medium is confirmed by the comparisons of the experimentally measured and theoretical densities—the measured density being 2.13 g/cc and the theoretical 2.15 g/cc, with the difference being less than 1%. This small difference exists despite the high amount of mineral material.

EXAMPLES

EXAMPLE 1

This example is to illustrate the preparation of the aggregates according to the invention. Four different techniques were employed, all of which persons skilled in the art know well and associate with this type of production.

First preparation technique: In a rapid mixer, brand name "Guedu", with an electrically heated 4.5 liter tank, a mixture having the following composition (in parts by weight) was prepared at 140° C.:

880 parts natural CaCO$_3$ ("Millicarb", a product of the company Omya), with specific surface 2m$^2$/g, mean diameter 3 microns, and a maximum dimension of 10 microns; the amount stated represents 790 parts by weight per 100 parts of the polymer;

111.4 parts "Vestoplast 3632" polyolefin polymer (supplied by the company Huels); index of fluidity 800 measured at 140° C. with a charge of 2.16 kg;

8 parts fluidifacient agent (an alkyl phosphate with formula C$_{14}$H$_{29}$—O—PO$_3$H$_2$) representing 0.91 parts by weight per 100 parts of the mineral materials; and 0.6 parts heat stabilizing agent ("Irganox 1010", supplied by Ciba-Geigy).

Initially, there was introduced into the tank heated to 140° C. about one third of the pulverulent mineral material (comprised of natural CaCO$_3$), along with the polyolefin polymer according to the invention, the stabilizer, and the fluidifacient.

The mixture was subjected to the mechanical action of a vane mixer at 1500 rpm. The temperature of the medium was maintained at 140° C.

The remaining two-thirds of the CaCO$_3$ was then added to the mixture, and the agitation was continued until a homogeneous paste was obtained. The entire procedure consumed about 15 min.

The paste obtained was then calendered to produce plates which were cut into small cubes of dimension 2-3 mm; these cubes comprised the aggregates according to the invention.

Second preparation technique: Into a laboratory co-malaxation device (trade name "Buss PR 46") disposed in an electrically heated malaxation zone, a mixture having the following composition (parts by weight) was introduced:

910 parts natural CaCO$_3$ ("Millicarb", a product of the company Omya), with specific surface 2m$^2$/g, mean diameter 3 microns, and a maximum dimension of 10 microns; the amount stated represents 1118 parts by weight per 100 parts of the polymer;

70 parts polyolefin polymer ("Vestoplast 3632" polyolefin polymer, supplied by the company Huels); with index of fluidity 800, at 140° C. and with a charge of 2.16 kg;

11.4 parts polyethylene wax ("Vestowax H2", supplied by the firm Huels);

8 parts fluidifacient agent (a polyoxyethylene alkyl phosphate, with formula C$_{12}$H$_{25}$—(OCH$_2$CH$_2$)$_2$—OPO$_3$H$_2$); the amount stated represents 0.88 parts by weight per 100 parts of the mineral materials; and 0.6 parts heat stabilizing agent ("Irganox 1010", supplied by Ciba-Geigy).

The aforesaid composition was premixed at ambient temperature in a rapid mixer of brand name "Papenmeyer" and was then transferred into the feed container of the "Buss" co-malaxation device. The malaxation zone of the latter was maintained at a temperature of 140° C., the screw was run at 60 rpm, and the delivery rate from the extruder was 50 kg/hr. The extruder was furnished with a die which permitted cutting at the head with rings of water.

Third preparation technique: In a "Guittard ML2" mixer disposed in a zone of malaxation heated to 140° C., a mixture was prepared with the following compositions (in parts by weight):

870 parts natural CaCO$_3$ ("Millicarb", a product of the company Omya), with specific surface 2m$^2$/g, mean diameter 3 microns, and a maximum dimension of 10 microns; the stated amount represents 698.8 parts by weight per 100 parts of the polymer;

124.5 parts polyolefin polymer ("Vestoplast 3632", supplied by the company Huels); index of fluidity 800, at 140° C. with charge 2.16 kg;

5 parts fluidifacient agent (a polyoxyethylene alkyl phosphate, with formula C$_{12}$H$_{25}$—(OCH$_2$CH$_2$)$_2$—O—PO$_3$H$_2$); and 0.5 parts heat stabilizing agent ("Irganox 1010", supplied by Ciba-Geigy).

The arms of the malaxation device rotated at 47 rpm. The time of malaxation was 30 min.

The paste thus obtained was calendered to form a plaste 3 mm thick which was subsequently cut into small cubes constituting the aggregates according to the invention.

Fourth preparation technique: Into an internal mixer of brand name "Bambury Farrel F 80" with a malaxation chamber preheated by a heat transfer fluid to 60° C. a mixture having the following composition was introduced (composition and parts by weight):

880 parts natural CaCO$_3$ ("Millicarb", a product of the company Omya), with specific surface 2m$^2$/g, mean diameter 3 microns, and a maximum dimension of 10 microns; the amount stated represents 790 parts by weight per 100 parts of the polymer;

111.5 parts polyolefin polymer ("Vestoplast 3632", supplied by the company Huels); index of fluidity 800 measured at 140° C. and with a charge of 2.16 kg;

8 parts fluidifacient agent (an alkyl phosphate with formula C$_{14}$H$_{29}$—O—PO$_3$H$_2$); the stated amount represents 0.91 parts by weight per 100 parts of the mineral materials; and 0.5 parts heat stabilizing agent ("Irganox 1010", supplied by Ciba-Geigy).

The final temperature of the mixture was 140° C. The speed of rotation of the vanes was 90 rpm.

The paste thus obtained was subjected to the action of granule-forming rolls, which produced the aggregates according to the invention.

EXAMPLE 2

The example illustrates the excellent redispersion, in polyolefin polymers, of the aggregates according to the invention prepared according to techniques 1 and 4 of Example 1.

Standard (ISO type) test samples were produced by injection molding, with the aid of a "Nestal Neomat 170/90" press operated by a microprocessor. The compression force was 900 kN. The diameter of the screw was 32 mm. The ratio of length to diameter (L/D) of the screw was 18.8.

The principal parameters of control of the press were the following:

Temperature of the material was 200°-240° C. depending on the polymer or copolymer into which the redistribution was carried out;

The temperature of the nozzle varied between 180° and 240° C. depending on the polymer or copolymer into which the redispersion was carried out;

The temperature of the mold was 40° C.;

The maximum speed of injection was 200 mm/sec;

The injection pressure was 100 bars;

The duration of the cycle was on the order of 62 sec, including a cooling time of 30 sec, an injection time of 2 sec, a holding time of 25 sec, and an inter-cycle time of 5 sec.

The press was fed successively with the individual polymers or copolymers serving as controls, and with the mixtures of the same polymers or copolymers into which the mineral materials had been introduced by means of the aggregates according to the invention—or by means of "master mixtures" chosen from among the best such mixtures currently commercially available.

For carrying out the redispersion test, the following formulations were used for each polymer or copolymer into which the redispersion was to be carried out:

The virgin polymer or copolymer (used as a control); and

The polymer or copolymer filled with pulverulent mineral materials in the amount of 20 wt. % and 40 wt. % (both amounts on the basis of the total formulation), these mineral materials being supplied either by the aggregates according to the invention or by "master mixtures" familiar to those skilled in the art.

In the case of the formulations comprising pulverulent mineral materials, the mixtures of polymers or copolymers with the aggregates according to the invention or with the "master mixtures" of known type were produced at ambient temperature in a mixer of brand name "Tonneau".

It is well known that for a given amount of filler, there is a close relation between the mechanical properties of a filled plastic material and the quality of the redispersion of the pulverulent mineral materials into the polymer into which the redispersion is to be carried out. Accordingly, all the test pieces produced by injection molding were subjected to tests of their mechanical properties, e.g., maximum tensile strength, tensile strength at breakage, elongation at breakage, 4-point flexure modulus of elasticity, and Charpy impact strength parameter at 0° C. and −23° C. The two mechanical properties which are most representative of good redispersion are the impact strength and the elongation at breakage.

In a first group of tests (1 to 5) redispersion of the aggregates according to the invention was carried out into a low density polyethylene ("Lacqtene 10780 MN 18"), supplied by the company Atochem; its index of fluidity at 190° C. with charge 2.16 kg is 7).

Test 1 involved virgin low density polyethylene, as described.

Test 2 involved incorporation into the said polymer of 20 wt. % of $CaCO_3$ ("Millicarb, from a "master mixture" provided by the company "Multibase" of France, under the trade name "LDPE 707 A", and reputed to have good redispersion qualities).

Test 3 involved incorporation, into the abovementioned polymer, of 20 wt. % $CaCO_3$ from the aggregate according to the invention produced according to preparation technique 1 of Example 1.

Test 4 involved the same type of formulation as Test 2 but with 40 wt. % $CaCO_3$ from the Multibase "LDPE 707 A" "master mixture".

Test 5 involved the same type of formulation as Test 3, but with 40 wt. % $CaCO_3$ provided by the aggregate according to the invention produced by preparation technique 1 of Example 1.

All the results relating to measures of mechanical properties are given in Table I.

TABLE I

| | LOW DENSITY POLYETHYLENE | | | | |
|---|---|---|---|---|---|
| | Test No. | | | | |
| | 1 Virgin Polymer | 2 Prior Art | 3 Invention | 4 Prior Art | 5 Invention |
| % of $CaCO_3$ | 0 | 20 | 20 | 40 | 40 |
| Maximum tensile strength | 10 | 10 | 9.4 | 10 | 8.4 |
| Tensile strength at breakage | 9.7 | 9.5 | 9 | 9.5 | 8 |
| Elongation at breakage | 210 | 153 | 180 | 95 | 125 |
| Modulus of elasticity, for 4-point flexure "Charpy" impact strength test | 120 | 160 | 150 | 240 | 190 |
| at 0° C. | not damaged | not damaged | not damaged | not damaged | not damaged |
| at −23° C. | not damaged | not damaged | not damaged | not damaged | not damaged |

In a second group of tests (6 to 10) redispersion of the aggregates according to the invention was carried out into linear low density polyethylene (Dow Chemical "Dowlex 2047", having index of fluidity 2.3 at 190° C. with charge 2.16 kg).

Test 6: Virgin polymer.

Test 7: Incorporation of 20 wt. % $CaCO_3$ ("Millicarb", supplied by the firm Omya, and having the characteristics mentioned supra), from Multibase "LDPE 707 A" "master mixture".

Test 8: Incorporation of 20 wt. % $CaCO_3$ ("Millicarb") from aggregates according to the invention produced by preparation technique 4 of Example 1.

Test 9: Incorporation of 40 wt. % $CaCO_3$ ("Millicarb") from Multibase "LDPE 707 A" "master mixture".

Test 10: Incorporation of 40 wt. % of $CaCO_3$ ("Millicarb") from the aggregates according to the invention defined in connection with Test 8.

All the results relating to measures of mechanical properties are given in Table II.

TABLE II

| | LINEAR LOW DENSITY POLYETHYLENE | | | | |
|---|---|---|---|---|---|
| | Test No. | | | | |
| | 6 Virgin Polymer | 7 Prior Art | 8 Invention | 9 Prior Art | 10 Invention |
| % of $CaCO_3$ | 0 | 20 | 20 | 40 | 40 |
| Maximum tensile strength | 17 | 17.8 | 17 | 14.4 | 11 |
| Tensile strength at breakage | 16.6 | 17.7 | 16.6 | 14.4 | 10.7 |
| Elongation at breakage | 510 | 552 | 600 | 182 | 354 |
| Modulus of elasticity, for 4-point flexure "Charpy" impact strength test | 200 | 240 | 230 | 410 | 290 |
| at 0° C. | not damaged | not damaged | not damaged | not damaged | not damaged |
| at −23° C. | not damaged | not damaged | not damaged | not damaged | not damaged |

In a third group of tests (11 to 23) redispersion of the aggregates according to the invention was carried out into high density polyethylene ("Hostalene GC 7260", supplied by the firm Hoechst; with index of fluidity 8, at 90° C. and charge 2.16 kg).

Test 11: Virgin polymer.

Test 12: Incorporation of 20 wt. % $CaCO_3$ ("Millicarb") from Multibase "LDPE 707 A" "master mixture".

Test 13: Incorporation of 20 wt. % $CaCO_3$ ("Millicarb"), from aggregates according to the invention produced according to preparation technique 1 of Example 1.

All the results relating to measures of mechanical properties are given in Table III.

TABLE III

| HIGH DENSITY POLYETHYLENE | | | |
|---|---|---|---|
| | Test No. | | |
| | 11 Virgin Polymer | 12 Prior Art | 13 Invention |
| % of $CaCO_3$ | 0 | 20 | 20 |
| Maximum tensile strength | 26 | 21 | 22 |
| Tensile strength at breakage | 10.4 | 9.4 | 12 |
| Elongation at breakage | 92 | 100.5 | 135.5 |
| Modulus of elasticity, for 4-point flexure "Charpy" impact strength test | 1020 | 1370 | 1040 |
| at 0° C. | not damaged | not damaged | not damaged |
| at −23° C. | not damaged | not damaged | not damaged |

In a fourth group of tests (14 to 18) redispersion of the aggregates according to the invention, and for comparison, of a "master mixture" from the prior art, was carried out into a polypropylene homopolymer (I.C.I. "Propatene GYM 45") having index of fluidity 15 (at 230° C., with charge 2.16 kg).

Test 14: Virgin polymer.

Test 15: Polymer filled 20 wt. % with $CaCO_3$ ("Millicarb"), from Multibase "PPH 7012 A" "master mixture".

Test 16: Polymer filled 20 wt. % with $CaCO_3$ ("Millicarb"), from aggregates according to the invention produced by preparation technique 4 of Example 1.

Test 17: Polymer filled 40 wt. % with $CaCO_3$ ("Millicarb") as per Test 15.

Test 18: Polymer filled 40 wt. % with $CaCO_3$ ("Millicarb") as per Test 16.

All the results relating to measures of mechanical properties are given in Table IV.

TABLE IV

| POLYPROPYLENE HOMOPOLYMER | | | | | |
|---|---|---|---|---|---|
| | Test No. | | | | |
| | 14 Virgin Polymer | 15 Prior Art | 16 Invention | 17 Prior Art | 18 Invention |
| % of $CaCO_3$ | 0 | 20 | 20 | 40 | 40 |
| Maximum tensile strength | 34.6 | 31 | 31 | 23 | 20 |
| Tensile strength at breakage | 17 | 26 | 22 | 18 | 16 |
| Elongation at breakage | 83 | 36 | 50 | 64 | 67 |
| Modulus of elasticity, for 4-point flexure "Charpy" impact strength test | 1257 | 1814 | 1565 | 2431 | 1876 |
| at 0° C. | 46 | 31.70 | 40 | 19.60 | 26 |
| at −23° C. | 11 | 20.40 | 20 | 13.30 | 16 |

In a fifth group of tests (19 to 23) redispersion of the aggregates according to the invention, with comparative tests of a "master mixture" from the prior art, was carried out into a polypropylene copolymer (Hoechst "Hostalene PPR 1042") having index of fluidity 4 (at 230° C. with charge 2.16 kg).

Test 19: Virgin polymer.

Test 20: Polymer filled 20 wt. % weith $CaCO_3$ ("Millicarb") from Multibase "PPC 7012 A" "master mixture".

Test 21: Polymer filled 20 wt. % with $CaCO_3$ ("Millicarb") from aggregates according to the invention produced by technique 1 of Example 1.

Test 22: Polymer filled 40 wt. % with $CaCO_3$ ("Millicarb") as per Test 20.

Test 23: Polymer filled 40 wt. % with $CaCO_3$ ("Millicarb") as per Test 21.

All the results relating to measurements of mechanical properties are given in Table V.

TABLE V

| ETHYLENE-PROPYLENE COPOLYMER | | | | | |
|---|---|---|---|---|---|
| | Test No. | | | | |
| | 19 Virgin Polymer | 20 Prior Art | 21 Invention | 22 Prior Art | 23 Invention |
| % of $CaCO_3$ | 0 | 20 | 20 | 40 | 40 |
| Maximum tensile strength | 26 | 23 | 22 | 19 | 18 |
| Tensile strength at breakage | 12 | 19 | 18 | 15 | 15 |
| Elongation at breakage | 294 | 200 | 307 | 137.5 | 320 |
| Modulus of elasticity, for 4-point flexure "Charpy" impact strength test | 990 | 1350 | 1165 | 1782 | 1373 |
| at 0° C. | not damaged | 62 | not damaged | 50 | not damaged |
| at −23° C. | not damaged | 21.30 | 47 | 16.50 | 35 |

Examination of the five Tables supra shows that for all the redispersion tests of the aggregates according to the invention the characteristics of elongation at breakage and impact resistance are at least equal to or sometimes superior to the corresponding characteristics for the test pieces of "master mixtures" from the prior art.

Thus, the indication is that the redispersion of the aggregates according to the invention is excellent, despite the increased amount of pulverulent mineral materials in said aggregates.

EXAMPLE 3

Similarly to Example 2, the present example illustrates the excellent redispersion into polyolefin polymers of aggregates according to the invention prepared according to technique 2 of Example 1 and containing 91 wt. % CaCO$_3$ "Millicarb", which represents 1118 parts by weight per 100 parts by weight of the polyolefin polymer and/or copolymer according to the invention (the polyolefin polymer and/or copolymer has an index of fluidity of at least 50).

A film 20 microns thick was extruded by means of an "Andouart" machine with screw diameter D=40 mm and length=18 D, and with die diameter 130 mm and die opening gap 0.5 mm. The speed of rotation of the screw was 50-70 rpm. The extrusion temperature was 190° C., and the index of swelling after extrusion was 2.4.

The "Andourat" machine was fed successively with the control virgin polymer into which the redispersion was to be carried out (Test 24) and a mixture formed from the polymer and a mineral filler introduced by means of aggregates according to the invention (Test 25).

Test 24 was carried out with a low density polyethylene having index of fluidity 2 (at 190° C., with charge 2.16 kg), marketed by Esso under the trade name "Escorene LD 104".

Test 25 was carried out with a mixture formed from the same polyethylene, with the addition of CaCO$_3$ ("Millicarb") in the amount of 10 wt. %, which was incorporated by means of aggregates according to the invention produced by technique 2 of Example 1.

It was possible in this way (Test 24) to extrude a film of virgin polymer 20 microns thick in a period of 30 min, without any breakage resulting.

In the same manner, and within an equivalent amount of time, it was also possible to produce a film with the filled polyethylene (Test 25) without any breakage resulting.

From the absence of any gaps in the film produced (based on examination with the naked eye and with a binocular loupe) it could be concluded that there was no aggregate in the film and that the redispersion of the aggregate according to the invention had been excellent.

EXAMPLE 4

Similarly to Examples 2 and 3, the present Example illustrates the use of another means of extrusion, in order to observe and verify good redispersion of the aggregates according to the invention into polyolefins typically used in the plastics processing industry.

The extrusion was carried out from a strip 3 mm thick, through a flat die, by means of a single-screw extruder (brand name "Torey") with screw diameter D=25 mm, screw length=15 D, die length 16 mm, and die height 2.5 mm. The speed of rotation of the screw was 50 rpm, the index of compression was 3, and the extrusion temperature was 170° C. for the polyethylene and 210° C. for the polypropylene copolymer.

The extruder was fed successively with the respective polymer and copolymer into which the redispersion was to be carried out. These individual feeds served as controls (Tests 26 and 29). The extruder was then fed successively with the mixture formed from the same polymer or copolymer and a mineral filler introduced in the form of granules according to public domain technology (Tests 27 and 30), and with the mixture formed from the same polymer or copolymer and a mineral filler introduced in the form of aggregates according to the invention (Tests 28 and 31). Using either filler addition medium, 1 wt. % CaCO$_3$ was incorporated in the final total mass.

Test 26 was carried out with a low density polyethylene ("Lacqtene 1070 MN 18", supplied by the firm Atochem) with index of fluidity 7 (at 190° C., with charge 2.16 kg). Test 29 was carried out with a polypropylene copolymer ("Lacqtene 3050 MN 4", supplied by Atochem) having index of fluidity 5 (at 230° C., with charge 2.16 kg).

Test 27 involved redispersion, into the polyethylene of Test 26, of 1 wt. % CaCO$_3$ "Millicarb", incorporated in the form of a Multibase "LDPE 707 A" "master mixture". Test 30 involved redispersion of 1 wt. % of the same CaCO$_3$ into the polypropylene copolymer of Test 29, from the same "master mixture" as used in Test 27.

Test 28 involved redispersion, into the polyethylene of Test 26, of 1 wt. % CaCO$_3$ "Millicarb", incorporated in the form of aggregates according to the invention, in which the aggregates were prepared according to technique 3 of Example 1. Test 31 involved redispersion of 1 wt. % of the same CaCO$_3$ into the polypropylene copolymer of Test 29 from the same aggregates according to the invention as used in Test 28.

Examination with a 50X binocular loupe showed excellent redispersion of the aggregates according to the invention, with no agglomerates. This dispersion was better than that obtained with the prior art "master mixtures".

EXAMPLE 5

This example illustrates excellent compatibility of the aggregates according to the invention when redispersion is carried out into polymers other than polyolefins—e.g., polystyrene, ABS plastics, and polyamide. Standardized test pieces were prepared by injection molding, by means of the "Nestal Neomat 170/90" press described in Example 2.

In a first group of tests (32 to 34), injection molding of polystyrene at 240° C. was carried out.

Test 32 involved injection molding of virgin polystyrene ("Hostyrene N 4000", supplied by Hoechst) having index of fluidity 4.5 (at 200° C., with charge 5 kg).

Test 33 involved incorporation, into the abovementioned polystyrene, of 20 wt. % of CaCO$_3$ ("Millicarb"), from a "master mixture" of known type (Multibase "PS 600 A").

Test 34 involved incorporation, into the above-mentioned polystyrene, of 20 wt. % CACO3 ("Millicarb"), from aggregates according to the invention prepared according to technique 4 of Example 1.

All the results relating to measured mechanical properties are given in Table VI.

TABLE VI

| | POLYSTYRENE | | |
|---|---|---|---|
| | Test No. | | |
| | 32 Virgin Polymer | 33 Prior Art | 34 Invention |
| % of CaCO$_3$ | 0 | 20 | 20 |
| Maximum tensile strength | 49 | 36 | 39 |
| Tensile strength at breakage | 46 | 35 | 38 |

TABLE VI-continued

POLYSTYRENE

|  | Test No. | | |
|---|---|---|---|
|  | 32 Virgin Polymer | 33 Prior Art | 34 Invention |
| Elongation at breakage | 7.5 | 11 | 12 |
| Modulus of elasticity, for 4-point flexure | 2840 | 3530 | 3300 |
| "Charpy" impact strength test | | | |
| at 0° C. | 19 | 18 | 18 |
| at −23° C. | 21 | 17 | 17 |

In a second group of tests (35 to 38), injection molding of an acrylonitrile-butadiene-styrene (ABS) copolymer with and without filler was carried out at 240° C.

Test 35 involved injection of virgin ABS ("Novodur PG 211", supplied by Bayer) having index of fluidity 4 (at 230° C., with charge 2.16 kg).

Test 36 involved incorporation of 20 wt. % $CaCO_3$ ("Millicarb"), from the same "master mixture" as used in Test 33.

Test 37 involved incorporation, into the above-mentioned ABS, of 20 wt. % $CaCO_3$ ("Millicarb"), from aggregates according to the invention prepared according to technique 4 of Example 1.

Test 38 involved incorporation, into the above-mentioned ABS, of 40 wt. % of $CaCO_3$, from the same aggregates as used in Test 37.

All the results relating to measured mechanical properties are given in Table VII.

TABLE VII

A.B.S.

|  | Test No. | | | |
|---|---|---|---|---|
|  | 35 Virgin Polymer | 36 Prior Art | 37 Invention | 38 Invention |
| % of $CaCO_3$ | 0 | 20 | 20 | 40 |
| Maximum tensile strength | 41 | 32 | 33 | 23.50 |
| Tensile strength at breakage | 35 | 30 | 30 | 21 |
| Elongation at breakage | 29 | 12 | 20 | 12 |
| Modulus of elasticity, for 4-point flexure | 2240 | 2760 | 2600 | 2970 |
| "Charpy" impact strength test | | | | |
| at 0° C. | 95 | 16 | 19 | 9 |
| at −23° C. | 78 | 15 | 17 | 7 |

In a third group of tests (39 to 41), injection molding of polyamide was carried out at a temperature of 240° C.

Test 39 involved injection molding of a virgin polyamide ("Ultramid B3 K", supplied by BASF) having index of fluidity 2.6 (at 220° C., with charge 2.16 kg).

Test 40 involved incorporation, into the above-mentioned polyamide, of 20 wt. % of $CaCO_3$ ("Millicarb"), from aggregates according to the invention prepared according to technique 1 of Example 1.

Test 41 involved incorporation, into the above-mentioned polyamide, of 40 wt. % of $CaCO_3$ from the same aggregates as used in Test 40.

All the results relating to measured mechanical properties are given in Table VIII.

TABLE VIII

POLYAMIDE

|  | Test No. | | |
|---|---|---|---|
|  | 39 Virgin Polymer | 40 Invention | 41 Invention |
| % of $CaCO_3$ | 0 | 20 | 40 |
| Maximum tensile strength | 49 | 52 | 45 |
| Tensile strength at breakage | 61 | 40 | 34 |
| Elongation at breakage | 310 | 80.50 | 17 |
| Modulus of elasticity, for 4-point flexure | 1620 | 2110 | 2500 |
| "Charpy" impact strength test | | | |
| at 0° C. | not damaged | 68.70 | 22 |
| at −23° C. | not damaged | 43 | 23 |

Examination of Tables VI and VII supra shows that for all the tests of redispersion of aggregates according to the invention the characteristics of elongation at breakage and impact strength are at least equal to and sometimes superior to the corresponding characteristics for test pieces of "master mixtures" which correspond to the prior art.

Regarding Table VIII, the tests reported relate only to redispersion of aggregates according to the invention into polyamides, because the prior art did not offer any "master mixture" which would enable comparative tests to be carried out. Examination of the injection molded test pieces and their mechanical characteristics enabled one to conclude that the redispersion, into the polyamides, of mineral materials supplied via aggregates according to the invention is excellent.

Thus, it appears that the redispersion of aggregates according to the invention into polymers other than polyolefins is excellent, despite the high weight fractions of pulverulent mineral materials in the aggregates.

Stated otherwise, the aggregates according to the invention have been shown to be compatible with a variety of polymers into which the redispersion is to be carried out, in contrast to granules of "master mixtures" of the prior art. These "master mixtures" are compatible only with the polymers entering into their composition.

EXAMPLE 6

This example illustrates the production of aggregates having a progressive weight percentage of mineral materials within the limits of the invention. These aggregates, being coherent, have a plastic appearance, and can be readily redispersed into one of the above-mentioned polymers and/or copolymers into which redispersion is to be carried out.

In this connection, eleven mixtures were prepared (Tests 42 to 52). The compositions of these various mixtures are presented in Table IX.

TABLE IX

|  |  | Test No. | | | | | | | | | |
|---|---|---|---|---|---|---|---|---|---|---|---|
|  |  | 42 | 43 | 44 | 45 | 46 | 47 | 48 | 49 | 50 | 51 | 52 |
| Amount of CaCO₃ | in wt. % × 10 | 750 | 800 | 850 | 880 | 910 | 750 | 800 | 750 | 800 | 850 | 880 |
|  | in parts by weight per 100 parts of the polymer | 309 | 416 | 599 | 786 | 1116 | 300 | 400 | 309 | 416 | 599 | 786 |
| Polymer | in wt. % × 10 | 243 | 192.5 | 142 | 112 | 81.5 | 250 | 200 | 243 | 192.5 | 142 | 112 |
| Fluidifacient agent | in wt. % × 10 (A) | 7 | 7.5 | 8 | 8 | 8.5 | 0 | 0 |  |  |  |  |
|  | (B) |  |  |  |  |  | 0 | 0 | 7 | 7.5 | 8 | 8 |

The CaCO₃ employed was "Millicarb".

The polymer introduced was "Vestoplast 3632", of the firm Huels, with index of fluidity 800 (at 140° C., with charge 2.16 kg).

The fluidifacient agent was: (A) The alkyl phosphate $C_{14}H_{29}$—$OPO_3H_2$; (B) The polyoxyethylene alkyl phosphate $C_8H_{17}(O$—$CH_2CH_2)_5$—$O$—$PO_3H_2$.

The various mixtures were prepared according to technique 2 of Example 1.

For Tests 42 to 46, the index of fluidity was measured at 140° C. with a charge of 2.16 kg, using a die of diameter 2.09 mm. Also measured were the actual densities of the aggregates according to the invention compared to their theoretical densities.

For Tests 47 to 48 and 49 to 52, only the indices of fluidity were measured; the same criteria were applied as in the preceding tests. All the results relating to the various tests are given in Tables X and XI.

TABLE X

FLUIDIFACIENT AGENT A

|  | Test No. | | | | |
|---|---|---|---|---|---|
|  | 42 | 43 | 44 | 45 | 46 |
| Amount of CaCO₃, wt. % × 10 | 750 | 800 | 850 | 880 | 910 |
| Index of fluidity, in grams per 10 min | 281 | 140 | 32 | 3.2 | 0.5 |
| Actual density, measured [g/cc] | 1.76 | 1.88 | 2.04 | 2.13 | 2.17 |
| Theoretical density, calculated [g/cc] | 1.76 | 1.89 | 2.05 | 2.15 | 2.27 |

TABLE XI

FLUIDIFACIENT AGENT B

|  | Test No. | | | | | |
|---|---|---|---|---|---|---|
|  | 47 | 48 | 49 | 50 | 51 | 52 |
| Amount of CaCO₃, wt. % × 10 | 750 | 800 | 750 | 800 | 850 | 880 |
| Index of fluidity, in grams per 10 min | 23.5 | 0 | 202 | 136 | 24.0 | 0.50 |

It can be seen from these Tables that it is effective to combine a polyolefin polymer having an index of fluidity at least equal to 50 with the fluidifacient agent; this is seen from the favorable comparison of the indices of fluidity (Tables X and XI).

It may also be concluded, from comparison of the actual measured densities and the theoretical densities, that the aggregates are indeed comprised of a plastic, coherent paste, thus demonstrating that the polymer and/or copolymer according to the invention serves at most to fill the interparticular voids of the highly compact structure formed by the pulverulent mineral materials, i.e., there are no masses of polymer and/or copolymer present to any substantial degree, other than masses occupying part of all of interparticular voids in a fairly compact particle bed structure; hence no appreciable masses of polymer and/or copolymer separate individual particles.

All the aggregates according to the invention have excellent redispersion into the polymers and/or copolymers described. This redispersion has been found to be superior to that of "master mixtures" from the prior art, even though the quantities of pulverulent mineral materials in the aggregates according to the invention are much greater than those which are attainable in practice under the prior art (1116 parts by weight per 100 parts of the polymer, versus 400 parts by weight per 100 parts of polymers). The method employed to test the redispersion was that described in Example 3 (extrusion of 20-micron-thick film).

EXAMPLE 7

This example illustrates the production of aggregates according to the invention comprising a variety of pulverulent mineral materials, e.g., talc, aluminum hydrate, calcined kaolin, and titanium dioxide.

All the aggregates (Tests 53 to 62) were prepared according to preparation technique 2 of Example 1.

For all of these tests, the polyolefin polymer according to the invention having index of fluidity of at least 50 was in the form of a mixture comprised of "Vestoplast 3632" (supplied by the firm Huels) and "Vestowax H2" (a polyethylene wax supplied by the firm Huels), in the amounts of 95 wt. % and 5 wt. %, respectively.

The fluidifacient agent was the same for all these tests as that used in Example 7. It comprised an alkyl phosphate of formula $C_{14}H_{29}$—$OPO_3H_2$.

The control tests (53, 56, 58, and 60) involving talc, kaolin, and aluminum hydrate were either very difficult or impossible to carry out at 80.0 wt. % (based on the weight of the total formulation), where one did not employ the novel combination comprised of at least one polyolefin having index of fluidity of at least 50 and further comprising the fluidifacient agent.

The indices of fluidity of the aggregates thus prepared were measured according to ASTM 1238, using the same die, and at two combinations of temperature and charge size (140° C., 2.16 kg; and 190° C., 5 kg).

All the data relative to the compositions of the aggregates and the results of the measured indices of fluidity are given in Table XII.

TABLE XII

| Mineral Material | Test No. | Amount of mineral materials, with respect to the weight of the total mixture, wt. % × 10 | Amount of the mineral materials, parts by weight per 100 parts by weight of the polymer | Amount of the fluidifacient agent, with respect to the weight of the total mixture, wt. % × 10 | Index of Fluidity 140° C.-2.16 kg | Index of Fluidity 190° C.-5 kg |
|---|---|---|---|---|---|---|
| Talc | 53 | 800 | 416 | 0 | not measurable | |
| "OOS" | 54 | 800 | 416 | 7.5 | — | 88 |
| Talcs de Luzenac | 55 | 850 | 599 | 8 | not measurable <10 kg | |
| Aluminum hydrate "OL 104" | 56 | 800 | 416 | 0 | it was not possible to produce the mixture | |
| Societe Martinswerk | 57 | 800 | 416 | 8 | — | 0.1 |
| Kaolin | 58 | 800 | 416 | 0 | it was not possible to produce the mixture | |
| "Calcine Whitetex" Societe Freeport | 59 | 800 | 416 | 8 | not measurable <10 kg | |
| TiO$_2$ | 60 | 800 | 416 | 0 | 2.80 | — |
| "RL 90" | 61 | 800 | 416 | 8 | 245.00 | — |
| Thann et Mulhouse | 62 | 870 | 717 | 8.7 | — | 10 |

The aggregates according to the invention involved in Tests 54, 55, 57, 59, 61 and 62 were subjected to tests of redispersion equivalent to those described in Examples 2 and 4.

Regardless of the pulverulent mineral material employed, all the described aggregates in the domain of the invention showed excellent redispersion into very diverse polymers and copolymers, e.g., PVCs, saturated polyesters (e.g., polyethylene terephthalate), and polycarbonates.

In order to accomplish the redispersion tests, a strip 2 mm thick was extruded from a flat die, using a single-screw extruder of brand name "Goettfert", with screw diameter D=3 and screw length=25 D. The extrusion was carried out at temperatures which are typical in processing the respective polymers into which the redispersion was being carried out.

The strips thus produced had a good surface appearance and good elasticity. They were used to prepare films of 100 micron thickness, with the aid of a heated compression press.

Examination of these films with a 50X binocular loupe showed very good homogeneity of the film, and absence of agglomerates.

What is claimed as new and desired to be secured by Letters Patent of the United States is:

1. A coherent thermoplastic aggregate with very high content of pulverulent mineral materials comprising:
   (a) 19.99 to 4.05 wt. % of at least one polyolefin polymer or copolymer having a fusion or softening temperature of at least 60° C. and an index of fluidity of at least 50,
   wherein said polyolefin polymer or copolymer is selected from the group consisting of linear or branched low density polyethylenes; high density polyethylenes; polypropylene homopolymers; polyisobutylenes; copolymers obtained by copolymerization of at least two monomers selected from the group consisting of ethylene, propylene, and isobutylene; halogenated polyolefins, and polypropylene modified by grafting or copolymerization with EPDM or SEBS,
   (b) 80-95 wt. % of a pulverulent mineral material, present in an amount of 400 to 1900 parts by weight per 100 parts by weight of the said polyolefin polymer or copolymer,
   said pulverulent mineral material having a particular size distribution such that 95% of the particles have at least one dimension <30 microns; and
   (c) as a fluidifacient agent in an amount of 0.01 to 0.95 wt. % of a phosphate having the following formula:

where A represents ethylene oxide; B represents propylene oxide; $0 \leq (m+n) \leq 24$; R represents a linear or nonlinear alkyl group which may be saturated or unsaturated, an aryl group, a saturated or unsaturated heterocycle, wherewith said alkyl, aryl, or heterocycle has 5-28 C atoms, or R is a steroid group; and R' is hydrogen, a carbon chain having 1-4 C atoms, or a group R as defined above; and wherein said aggregate has a density near to the theoretical density of said pulverulent mineral material while still providing excellent compatibility with said polymer or copolymer, and wherein the interparticle voids between the grains of said mineral material are filled by at least one said polymer or copolymer.

2. The coherent thermoplastic aggregate of claim 1, further comprising at least one additive selected from the group consisting of thermal stabilizing agents, photochemical stabilizing agents, lubrifacients, plasticizers, antistatic agents, fire retardants and metal-passivating agents.

3. The coherent thermoplastic aggregate of claim 1, comprising:
   85.7-92.3 wt. % of said pulverulent mineral material, present in the amount of 600-1200 parts by weight per 100 parts by weight of said polyolefin polymer or copolymer.

4. The coherent thermoplastic aggregate of claim 1, wherein said polyolefin polymer or copolymer is obtained by mixing at least two of said polyolefin polymers or copolymers.

5. The coherent thermoplastic aggregate of claim 1, wherein said polyolefin polymer or copolymer has a fusion or softening temperature of at least 60° C. and an index of fluidity of at least 200 (ASTM 1238).

6. The coherent thermoplastic aggregate of claim 1, wherein said pulverulent mineral material contains at least one mineral salt or mineral oxide, said salt or oxide containing at least one metallic element.

7. The coherent thermoplastic aggregate of claim 6, wherein said pulverulent mineral material is selected from the group consisting of alkaline earth carbonates, zinc carbonate, dolomite, lime, magnesia, barium sulfate, calcium sulfate, aluminum hydroxides, silica, argils, kaolin, talc, mica, metal oxides, glass fibers and glass microspheres, and wollastonite.

8. The coherent thermoplastic aggregate of claim 1, wherein pulverulent organic material of natural or synthetic origin is added to said pulverulent mineral material, said organic material being selected from the group consisting of colorants, starch, cellulose fibers, cellulose granules, and carbon fibers.

9. The coherent thermoplastic aggregate of claim 8, wherein the said pulverulent mineral material or said pulverulent organic material has at least one dimension between 0.01 and 100 microns.

10. The coherent thermoplastic aggregate of claim 9, wherein said pulverulent mineral material or said pulverulent organic material has at least one dimension between 0.1 and 5.0 microns.

11. The coherent thermoplastic aggregate of claim 1, wherein said alkyl, aryl, or heterocycle has 8–24 C atoms.

12. The coherent thermoplastic aggregate of claim 1, wherein R contains at least one functional group selected from the group consisting of halogen, —OH, —COOH, —COOR, —NO$_2$, —NH$_2$, —CONH$_2$, —CN and —OPO$_3$H$_2$.

13. The coherent thermoplastic aggregate of claim 1, wherein the group R' is identical to the group R.

* * * * *